United States Patent
Wang et al.

(10) Patent No.: US 9,225,770 B2
(45) Date of Patent: Dec. 29, 2015

(54) CLOUD COMPUTING SECURE DATA STORAGE

(75) Inventors: Xiaodong Wang, Shanxi (CN); Jun Fang, Shanxi (CN)

(73) Assignee: Empire Technology Development LLC, Wilmington, DE (US)

( * ) Notice: Subject to any disclaimer, the term of this patent is extended or adjusted under 35 U.S.C. 154(b) by 106 days.

(21) Appl. No.: 13/817,694

(22) PCT Filed: Mar. 9, 2012

(86) PCT No.: PCT/CN2012/072122
§ 371 (c)(1),
(2), (4) Date: Feb. 19, 2013

(87) PCT Pub. No.: WO2013/131273
PCT Pub. Date: Sep. 12, 2013

(65) Prior Publication Data
US 2014/0196124 A1    Jul. 10, 2014

(51) Int. Cl.
*G06F 7/04* (2006.01)
*H04L 29/08* (2006.01)
(Continued)

(52) U.S. Cl.
CPC ............... *H04L 67/06* (2013.01); *G06F 3/067* (2013.01); *G06F 3/0622* (2013.01); *G06F 3/0637* (2013.01); *G06F 17/00* (2013.01); *G06F 21/6218* (2013.01); *G06F 21/78* (2013.01); *H04L 63/083* (2013.01); *H04L 63/20* (2013.01);
(Continued)

(58) Field of Classification Search
CPC .............. H04L 63/0428; H04L 63/065; H04L 63/0861; H04L 63/061; H04L 9/085; H04L 67/1097; G06F 21/10; G06F 11/2094; G06F 11/1076
See application file for complete search history.

(56) References Cited

U.S. PATENT DOCUMENTS 7,778,417 B2 *  8/2010  Rutkowski et al. ........... 380/201
8,009,830 B2    8/2011  Orsini et al.
(Continued)

FOREIGN PATENT DOCUMENTS

CN    101375284 A    2/2009
CN    101401341 A    4/2009
(Continued)

OTHER PUBLICATIONS

Isard, M. et al, Quincy: Fair scheduling for distributed computing clusters. In Proceedings of 22nd ACM Symposium on Operating Systems Principles (SOSP '09), Oct. 2009, pp. 261-276, Association for Computing Machinery, Inc., Big Sky, MT.
(Continued)

*Primary Examiner* — Shewaye Gelagay
*Assistant Examiner* — Khoi Le

(57) ABSTRACT

Method and implementations for providing a secure data storage service in a cloud computing environment are generally disclosed. The method comprises: partitioning a data resource into data particles, assigning logic groups to the data particles, assigning physical storage groups to the data particles, and/or storing each physical storage group at corresponding storage resource, receiving a request for the data resource, determining whether the request for the data resource is valid, and if the request is valid, transmitting the data particles of the data resource to the client. The method enables improved security for accessing data, and also improves the user experience in cloud computing environments.

27 Claims, 5 Drawing Sheets

(51) Int. Cl.
*G06F 17/00* (2006.01)
*H04L 29/06* (2006.01)
*G06F 3/06* (2006.01)
*G06F 21/78* (2013.01)
*G06F 21/62* (2013.01)

(52) U.S. Cl.
CPC .... *H04L 67/1097* (2013.01); *G06F 2221/2149* (2013.01)

(56) References Cited

U.S. PATENT DOCUMENTS

| | | | |
|---|---|---|---|
| 8,320,560 B2 | 11/2012 | Orsini et al. | |
| 8,351,600 B2 * | 1/2013 | Resch | 380/28 |
| 2003/0188153 A1 * | 10/2003 | Demoff et al. | 713/153 |
| 2006/0177061 A1 * | 8/2006 | Orsini et al. | 380/268 |
| 2007/0160198 A1 | 7/2007 | Orsini et al. | |
| 2009/0254750 A1 * | 10/2009 | Bono et al. | 713/170 |
| 2011/0258439 A1 | 10/2011 | Orsini et al. | |
| 2011/0296195 A1 * | 12/2011 | Nakagawa et al. | 713/189 |
| 2012/0221855 A1 | 8/2012 | Orsini et al. | |
| 2012/0221856 A1 | 8/2012 | Orsini et al. | |
| 2012/0255035 A1 | 10/2012 | Orsini et al. | |
| 2012/0299313 A1 | 11/2012 | Organek | |

FOREIGN PATENT DOCUMENTS

| | | |
|---|---|---|
| WO | 2006047694 A1 | 5/2006 |
| WO | 2008054406 A2 | 5/2008 |
| WO | 2011157708 A1 | 12/2011 |

OTHER PUBLICATIONS

Kusnetzky, D., Nasuni cloud storage gateway, Jun. 1, 2010, accessed online on Jan. 3, 2012 via zdnet.com/blog/virtualization/nasuni-cloud-storage-gateway/1983.

Orenstein, G., Show me the gateway-taking storage to the cloud, Jun. 22, 2010, accessed online on Jan. 3, 2012 via gigaom.com/2010/06/22/show-me-the-gateway-taking-storage-to-the-cloud.

Needle, D., Cloud storage poised to save enterprises money: report, Jul. 30, 2010, accessed online on Jan. 3, 2013 via datamation.com/datbus/article.php/3896116/cloud-storage-poised-to-save-enterprises-money-report.htm.

Wexler, S., CTERA rolls out channel-friendly cloud storage portal, Apr. 20, 2010, accessed online on Jan. 3, 2013 via channelinsider.com/c/a/storage/CTERA-rolls-out-channelfriendly-cloud-storage-portal-863639.

Unisys, Unisys moves to break through barriers to adoption of cloud computing, new strategy combines innovative security with suite of solutions to expand clients' options for delivery of services in the cloud, Jun. 30, 2009, Blue Bell, PA, USA.

The State Intellectual Property Office, the PR China, International Search Report and Written Opinion of the International searching authority for PCT/CN2012/072122 mailed on Dec. 13, 2012, China.

"Wuala," accessed at https://web.archive.org/web/20120203060627/http://en.wikipedia.org/wiki/Wuala, last modified on Dec. 31, 2011, pp. 1-5.

* cited by examiner

400 A computer program product

402 A signal bearing medium

404 Machine-readable instructions that, when executed, cause a cloud computing environment to provide a secure data storage service by:

partitioning a data resource into a plurality of data particles;
   changing, over time, a logical separation and a physical separation of the data particles by repeatedly:
      assigning a plurality of logic groups to the data particles, wherein each logic group includes one or more data particles including at least one communication data particle, wherein the one or more data particles in each of the logic groups is configured to communicate with any other data particle in that logic group, and wherein each communication data particle is configured to communicate with the cloud computing resource;
      assigning a plurality of physical storage groups to the data particles, wherein each of the physical storage groups includes one or more data particles; and
      storing each physical storage group at a corresponding storage resource of a plurality of storage resources of the cloud computing environment, wherein each storage resource is physically separate from the other storage resources;
   receiving a request for the data resource from a client;
   determining whether the request for the data resource is valid;
   if the request for the data resource is valid, transmitting the data particles of the data resource to the client;
   encrypting the data resource before partitioning the data resource into a plurality of data particles; or
   encrypting the plurality of data particles.

| 406 a computer-readable medium | 408 a recordable medium | 410 a communications medium |

Fig. 4

CLOUD COMPUTING SECURE DATA STORAGE

CROSS-REFERENCE TO RELATED APPLICATION

This Application is the U.S. National Stage filing under 35 U.S.C. §371 of PCT Application No. PCT/CN12/72122, filed on Mar. 9, 2012.

BACKGROUND

Unless otherwise indicated herein, the approaches described in this section are not prior art to the claims in this application and are not admitted to be prior art by inclusion in this section.

Current data security measures may store data at a central server, with the data being protected by, for example, user authentication measures and encryption techniques. However, as computing environments have evolved such as for example, cloud computing environments, the current data security solutions may also evolve to facilitate utilization of ubiquitous computing environments, which may be associated with cloud computing environments. Accordingly, as techniques improve for accessing data intended to be secure, increased security measures may improve the user experience in cloud computing environments.

SUMMARY

In various embodiments, the present disclosure describes examples methods for providing a secure data storage service in a cloud computing environment. Example methods may include partitioning a data resource into data particles and changing, over time, a logical and a physical separation of the data particles by repeatedly assigning logic groups to the data particles with each logic group including data particles with at least one being a communication data particle such that the data particles are configured to communicate with any other data particle in that logic group, and with each communication data particle configured to communicate with a resource of the cloud computing environment, assigning physical storage groups to the data particles, and storing each physical storage group at a corresponding and physically separate storage resource of the cloud computing environment. The example method may also include receiving a request for the data resource from a client, determining whether the request for the data resource is valid, and if the request for the data resource is valid, transmitting the data particles of the data resource to the client.

In various embodiments, the present disclosure also describes example machine readable non-transitory medium having stored therein instructions that, when executed, cause a cloud computing resource in a cloud computing environment to provide a secure data storage service. Example machine readable non-transitory media may have stored therein instructions that, when executed, cause the cloud computing resource in the cloud computing environment to provide a secure data storage service by partitioning a data resource into data particles and changing, over time, a logical and a physical separation of the data particles by repeatedly assigning logic groups to the data particles with each logic group including data particles with at least one being a communication data particle such that the data particles are configured to communicate with any other data particle in that logic group, and with each communication data particle configured to communicate with a resource of the cloud computing environment, assigning physical storage groups to the data particles, and storing each physical storage group at a corresponding and physically separate storage resource of the cloud computing environment, and upon receiving a request for the data resource from a client, determining whether the request for the data resource is valid, and if the request for the data resource is valid, transmitting the data particles of the data resource to the client.

In various embodiments, the present disclosure also describes example systems. Example systems may include a processor and a machine readable medium having stored therein instructions that, when executed, cause cloud computing resource in a cloud computing environment to provide a secure data storage service by partitioning a data resource into data particles and changing, over time, a logical and a physical separation of the data particles by repeatedly assigning logic groups to the data particles with each logic group including data particles with at least one being a communication data particle such that the data particles are configured to communicate with any other data particle in that logic group, and with each communication data particle configured to communicate with a resource of the cloud computing environment, assigning physical storage groups to the data particles, and storing each physical storage group at a corresponding and physically separate storage resource of the cloud computing environment, and upon receiving a request for the data resource from a client, determining whether the request for the data resource is valid, and if the request for the data resource is valid, transmitting the data particles of the data resource to the client.

The foregoing summary may be illustrative only and may not be intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 4 is an illustration of an example computer program product; and

DETAILED DESCRIPTION

Figure 1:
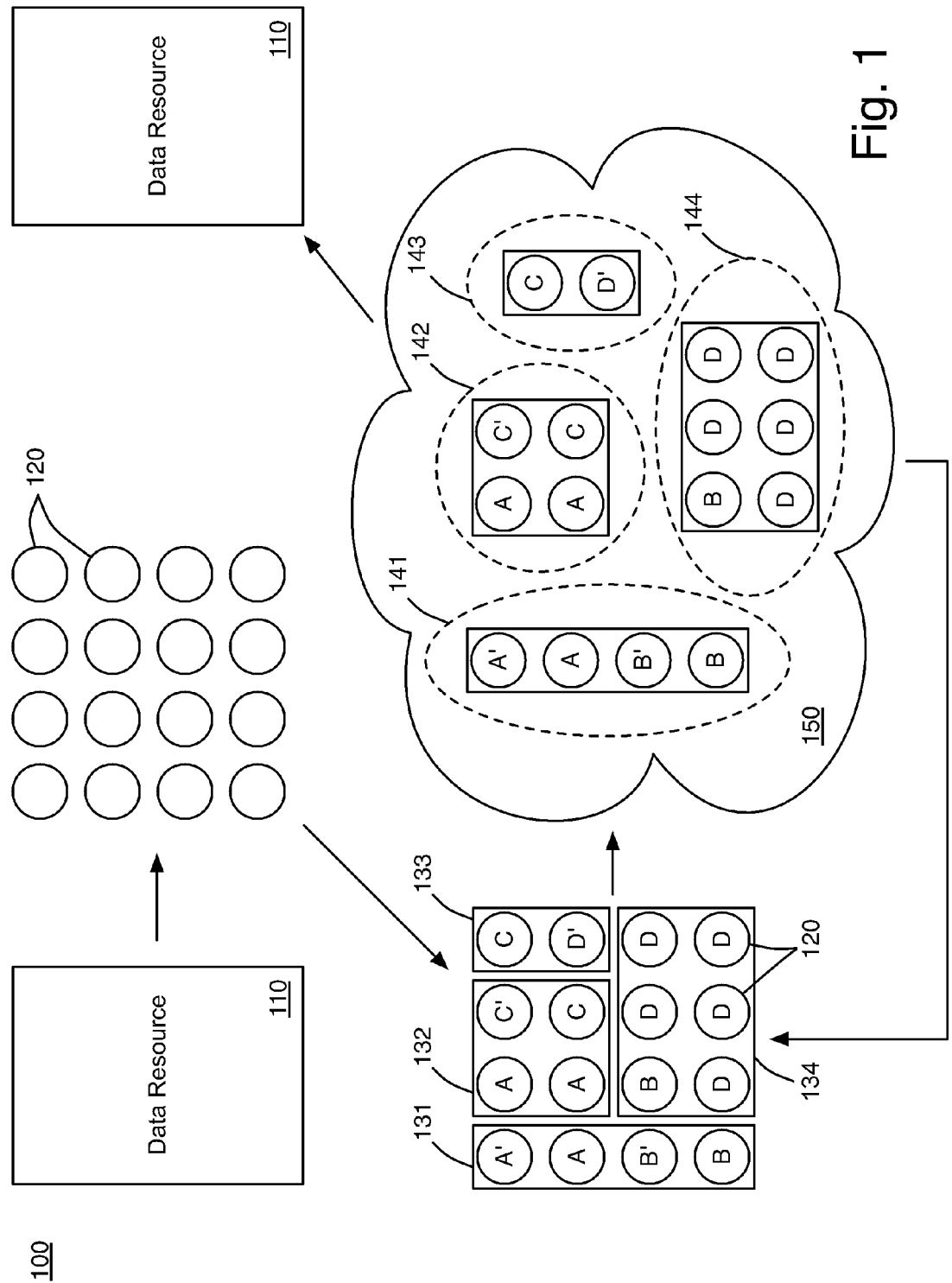
FIG. 1 is an illustration of a block diagram of an example method for providing a secure data storage service in a cloud computing environment.

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, devices, systems and computer readable media related to providing secure data storage services in cloud computing environments.

In general, a data resource such as a data file, an image file, an audio file, a video file, an application, or the like may be securely stored in a cloud computing environment using any one or more of the techniques discussed herein. In some examples, a data resource may be partitioned into data particles. The data particles may be separated logically and/or physically. The logical separation may include assigning logic groups to the data particles such that all of the data particles may be assigned to a logic group. In some examples, the data particles in each logic group may be configured to communicate the other data particles in that logic group. In some examples, one or more data particles in each logic group may be configured as a communication data particle such that the communication data particle in each group may communicate with a central resource of the cloud computing environment.

The physical separation of the data particles may include assigning storage groups to the data particles such that all of the data particles may be assigned to a storage group. In general, any number of logic groups and storage groups may be used. The logic groups and the storage groups may, in general, include different groups of data particles. In some examples, the logic groups and storage groups may be assigned randomly. Each assigned storage group of data particles may be physically stored at separate storage resources of the cloud computing environment. The logical and/or physical separation of the data particles may provide enhanced security over maintaining an entire data resource at a single storage resource.

In some examples, the described logical and physical separations may be repeatedly or periodically changed over time such that successive assignments of logic groups and/or storage groups and successive physical storage of the newly assigned storage groups may be provided. Such implementations may physically move data particles and may logically move or drift the data particles. Such methods of moving or dynamic data particles may provide enhanced security. Upon receiving a valid request for the data resource, the data resource may be transmitted to the requestor (e.g., a client). The data resource may be reconstructed and transmitted to the client or the data particles may be separately transmitted such that the receiving client may reconstruct the data resource.

FIG. 1 is an illustration of a block diagram of an example method 100 for providing a secure data storage service in a cloud computing environment, arranged in accordance with at least some embodiments of the present disclosure. In general, method 100 may be performed at any suitable device, devices, system, resource, or groups of resources as discussed herein. As shown, method 100 may include a data resource 110 for which a secure data storage service may be provided. In general, data resource 110 may include any suitable data resource such as, for example, a data file, an image file, an audio file, a video file, an application, or the like. In some examples, data resource 110 may be received from a client device for secure storage in a cloud computing environment.

As shown, data resource 110 may be partitioned into a multiple number of data particles 120. In general, data resource 110 may be partitioned by any suitable computing resource using any suitable technique or techniques. In some examples, data resource 110 may be partitioned at a resource of a cloud computing environment. In general, data resource 110 may be partitioned into any number of data particles. In some examples, the number of data particles 120 may depend on the size of data resource 110. In some examples, data particles 120 may be substantially the same size. In some examples, data particles 120 may be different sizes. In general, data particles 120 may include any suitable information including a portion of data resource 110 and information for implementing the techniques discussed and, in particular, those discussed with respect to FIG. 3 below.

As shown, data particles 120 may be assigned to a multiple number of logic groups and/or physical storage groups. In FIG. 1, the assigned logic groups of data particles 120 are represented by letters such that, in the illustrated example, data particles 120 may be assigned to logic groups A, B, C, and D. As is also illustrated in FIG. 1, one or more data particles of each logic group may be assigned as communication data particles. In some examples, the communication data particles may be termed key data particles. The data particles may be configured to communicate using any suitable technique or techniques. In some examples, the data particles may be configured to communicate via peer-to-peer communications. In the illustrated example, the communication data particles are designated A', B', C', and D'.

In general, the data particles in each logic group may be configured to communicate with any other data particle in that logic group and the communication data particle in each logic group may be configured to communicate with a resource of the cloud computing environment. Further, the data particles may not be configured to communicate with data particles of other logic groups, thus providing logical and/or communicative separation of the groups. As is discussed further herein, such techniques may allow for data resource 110 to be reconstructed upon a valid request for data resource 110. In general, logic groups may be assigned to data particles 120 in any suitable manner. In some examples, the number of logic groups may depend on the number of data particles 120. In some examples, the logic groups may each include substantially the same number of data particles 120. In some examples, the number of data particles 120 in each logic group may be different. In some examples, the number of logic groups may be randomly selected. In some examples, data particles 120 may be randomly assigned to logic groups.

As shown in FIG. 1, data particles 120 may be assigned to physical storage groups 131, 132, 133, 134. In general, data particles 120 may be assigned to physical storage groups 131, 132, 133, 134 such that physical storage groups 131, 132, 133, 134 may each be stored at physically separate storage resources of a cloud computing environment. In general, physical storage groups 131, 132, 133, 134 may be assigned to data particles 120 in any suitable manner. In some examples, the number of physical storage groups 131, 132, 133, 134 may depend on the number of data particles 120. In some examples, the number of physical storage groups 131, 132, 133, 134 may depend on a number and/or storage capability of storage resources available in a cloud computing environment. In some examples, the physical storage groups 131, 132, 133, 134 may include substantially the same number of data particles 120. In some examples, the number of data particles 120 in each of physical storage groups 131, 132, 133, 134 may be different. In some examples, the number of physical storage groups 131, 132, 133, 134 may be randomly selected. In some examples, data particles 120 may be randomly assigned to physical storage groups 131, 132, 133, 134.

As shown in FIG. 1, physical storage groups 131, 132, 133, 134 of data particles 120 may be stored at storage resources 141, 142, 143, 144 of a cloud computing environment 150. In general, storage resources 141, 142, 143, 144 may include any suitable storage resource such as a computing device, a storage server, a cloud storage device, or the like. In general, data particles 120 may be stored at storage resources 141, 142, 143, 144 using any suitable technique or techniques. In some examples, storage resources 141, 142, 143, 144 may include one or more nodes of a cloud computing environment and data particles 120 may be transmitted between nodes under the control of a control resource of the cloud computing environment. In such examples, data particles 120 may be transmitted between nodes using any suitable communications techniques, such as packet based communications techniques, peer-to-peer communications techniques, or the like.

As shown in FIG. 1, in some examples, method 100 may change, over time, the logical separation and the physical separation of data particles 120 such that the assigning of logic groups, the assigning of physical storage groups, and the storing of the assigned physical storage groups may be performed repeatedly. Such techniques may physically move data particles and may logically move or drift the data particles for enhanced security. In general, either the logical separation or the physical separation or both may change with each iteration. In general, any frequency of iterations may be used. In some examples, the separations may be changed on the order of hourly, daily or weekly, or the like. In some examples, the frequency may depend on the security level of data resource 110, the available resources of cloud computing environment 150, or the like. In some examples, the frequency may be random which may offer the advantage of enhanced security. In some examples, the frequency may be constant which may offer the advantage of simplicity of implementation.

As shown in FIG. 1, in some examples, a valid request may be made for data resource 110 such that data resource 110 may be reconstructed. In some examples, a request for data resource 110 may be received from a requestor, such as a client. It may be determined whether the request is valid and, if so, data resource 110 may be provided to the client. In some examples, data resource 110 may be reconstructed at the cloud computing environment and transmitted to the client. In some examples, the data particles may be separately transmitted such that the receiving client may reconstruct the data resource.

As discussed, data security measures may be provided for data resource 110 by changing, over time, a logical separation and a physical separation of data particles 120. In some examples, additional data security measures may be provided. In some examples, data resource 110 may be encrypted prior to being partitioned into data particles 120. In some examples, data particles 120 may be encrypted after being partitioned from data resource 110. Such encryption methods may be implemented using any suitable encryption technique or techniques including, for example, cipher techniques, password protected disk encryption techniques or the like. As discussed, in some examples, it may be determined whether a client resource request is valid. In some examples, such a determination may include authentication techniques. In some examples, such a determination may include evaluating a username and password of the requesting client.

Figure 2:
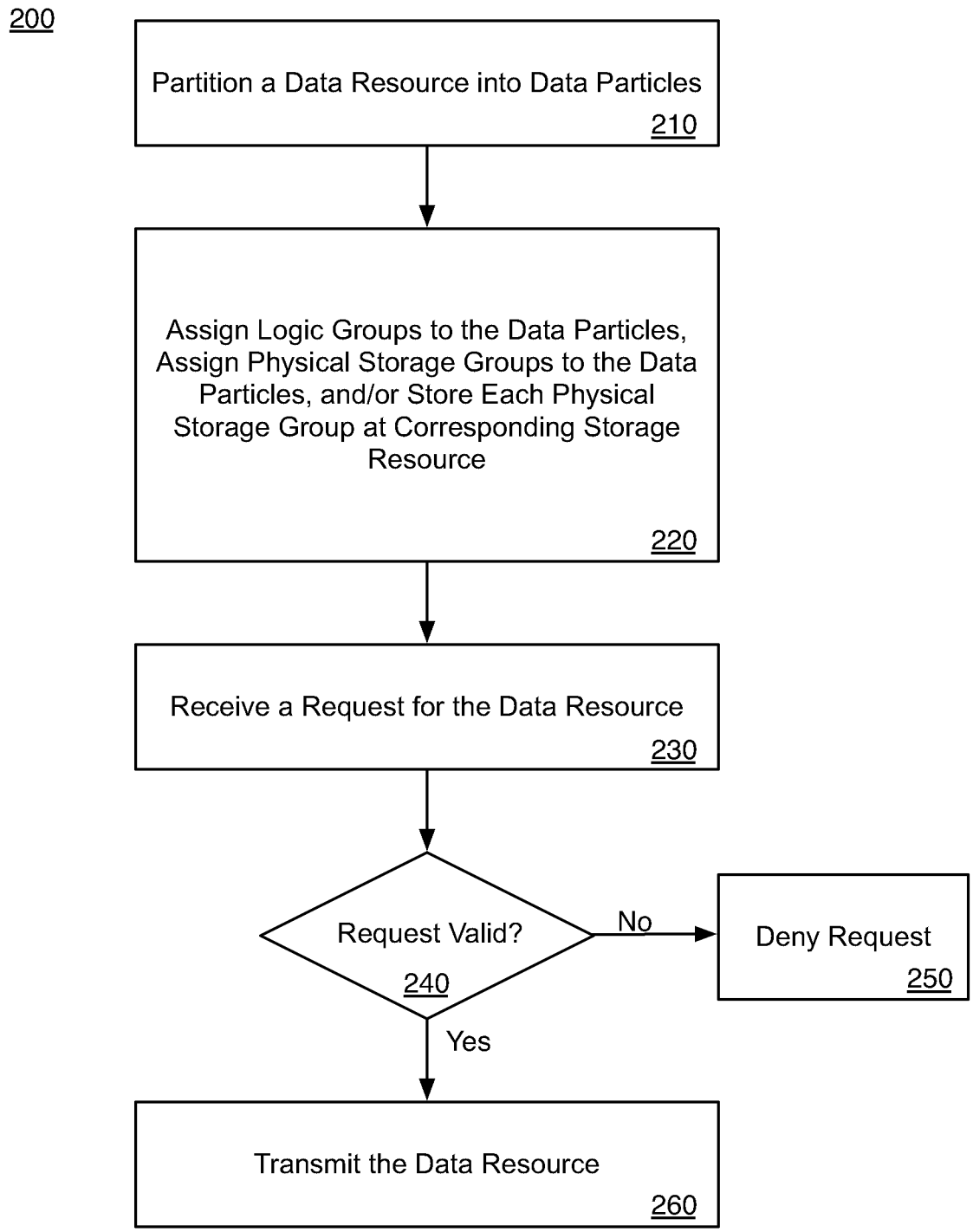
FIG. 2 is an illustration of a flow diagram of an example method for providing a secure data storage service in a cloud computing environment.

FIG. 2 is an illustration of a flow diagram of an example method 200 for providing a secure data storage service in a cloud computing environment, arranged in accordance with at least some embodiments of the present disclosure. In general, method 200 may be performed by any suitable device, devices, or system such as those discussed herein. In some examples, method 200 may be performed by a server system. In some examples, method 200 may be performed by a computer, a multiple number of computers, a server, a computing resource, a virtual machine, a computing cluster, a data center, a data center cluster, a cloud computing resource or resources, or the like. Method 200 sets forth various functional blocks or actions that may be described as processing steps, functional operations, events and/or acts, etc., which may be performed by hardware, software, and/or firmware. Numerous alternatives to the functional blocks shown in FIG. 2 may be practiced in various implementations. For example, intervening actions not shown in FIG. 2 and/or additional actions not shown in FIG. 2 may be employed and/or some of the actions shown in FIG. 2 may be eliminated, without departing from the scope of claimed subject matter. Method 200 may include one or more of functional operations as indicated by one or more of blocks 210, 220, 230, 240, 250, and/or 260. The process of method 200 may begin at block 210.

At block 210, "Partition a Data Resource into Data Particles", a data resource may be partitioned into a multiple number of data particles. As discussed, the data resource may include any suitable data resource such as a data file, an image file, an audio file, a video file, an application, or the like. The data resource may be partitioned using any suitable technique or technique including those discussed herein. In general, the data resource may be partitioned by any suitable computing device. In some examples, the data resource may be partitioned by a computer, a plurality of computers, a server, a computing resource, a resource of a cloud computing environment, a virtual machine, a computing cluster, or the like. In some examples, the data resource may be partitioned by a data security resource of a cloud computing environment.

In general, the data resource may be partitioned using any suitable technique or techniques and the data particles may include any suitable information. In some examples, partitioning the data source into data particles may include numbering each data particle for later reassembly. In some examples, the data particles may include a particle identifier, a creation time stamp, an indication of whether the data particle is one of the communication data particles, a first address indicating the storage resource of the data particle, a second address indicating at least one storage resource of at least one data particle in the logic group of the data particle, a gather address, a data packet, a cyclic redundancy check code, or the like, as is discussed further herein and, in particular, with respect to FIG. 3. In some examples, the data particles may be loaded into an agent. The process of method 200 may continue at block 220.

At block 220, "Assign Logic Groups to the Data Particles, Assign Physical Storage Groups to the Data Particles, and/or Store Each Physical Storage Group at Corresponding Storage Resource", one or more logic groups may be assigned to the particles, one or more physical storage groups may be assigned to the data particles, and/or each physical storage group of the data particles may be stored at a corresponding storage resource. As discussed herein, the techniques discussed with respect to block 220 may be performed substantially repeatedly and/or continuously such that a logical and/or physical separation of the data particles may be changed over time.

As discussed, at block 220, one or more logic groups may be assigned to the data particles. The logic groups may be assigned using any suitable technique or techniques including those discussed herein. In general, each logic group may include one or more data particles. In some examples, the data particles of each logic group may be configured to communicate with any other data particles in that logic group. In some examples, each logic group may include one or more data particles that may be configured to be a communication data particle (which may be termed a key data particle) such that the communication data particle may communicate with a resource of a cloud computing environment, such as the data security resource of the cloud computing environment. In general, the logic groups may be assigned using any suitable technique or techniques. In some examples, the logic groups may be assigned randomly.

As discussed, at block 220, one or more physical storage groups may be assigned to the data particles. The physical storage groups may be assigned using any suitable technique or techniques including those discussed herein. In general, the physical storage groups may be assigned using any suitable technique or techniques. In some examples, the physical storage groups may be assigned randomly. In some examples, the assignment of the physical storage groups and the assignment of the logical groups may be performed independently. In general, each physical storage group may include one or more data particles such that those data particles may be separately stored at physically separate storage resources of a cloud computing environment.

As discussed, at block 220, each physical storage group of the data particles may be stored at a corresponding storage resource. The physical storage groups may be stored using any suitable technique or techniques including those discussed herein. In some examples, each storage resource may be physically separate from the other storage resources. In general, the storage resources may be any suitable storage resources such as a computing device, a storage server, a cloud storage device, or the like. In some examples, the storage resources may include one or more nodes of a cloud computing environment and the data particles may be transmitted between nodes under the control of a control resource such as the data security resource of the cloud computing environment. In such examples, the data particles may be transmitted between nodes using any suitable communications techniques such as packet based communications techniques, peer-to-peer communications techniques, or the like.

As discussed, the process of method 200 discussed with respect to block 220 may be performed such that the discussed logical and physical separations of the data particles may be repeatedly changed over time. Such techniques may provide successive assignments of logic groups and/or storage groups and successive physical storage of the newly assigned storage groups. In general, either the logical separation or the physical separation or both may change with each iteration. In some examples, only the logical separation may change with an iteration (and the techniques related to assigning and storing physical storage groups may not be implemented). In some examples, only the physical separation may change with an iteration (and the techniques related to assigning logic groups may not be implemented). In general, each iteration may use any of the techniques discussed herein. In some examples, the discussed random selection of the number of logic groups, random assignment of logic groups, random selection of the number of physical storage groups, and the random assignment of physical storage groups may be used. In some examples, iterations may include aggregating logic groups and/or physical storage groups or splitting logic groups and/or physical storage groups, as is discussed further herein.

In some examples, the discussed iterations may be performed on a frequency in the range of about hourly, daily, or weekly, or the like. In some examples, the frequency may depend on the security level of data resource, the available resources of cloud computing environment, or the like. In some examples, the frequency may be random such that the logical separation and the physical separation of the data particles may be performed after a random duration. In some examples, the frequency may be constant. The process of method 200 may continue at block 230.

At block 230, "Receive a Request for the Data Resource", a request for the data resource may be received. In general, a request may be received in any suitable manner from any suitable source. In some examples, a request may be received from a client of the cloud computing environment. In general, the request may be received using any suitable communications techniques. In some examples, a received request may be transmitted to the data security resource of the cloud computing environment. The process of method 200 may continue at decision block 240.

At decision block 240, "Request Valid?", it may be determined whether the request for the data resource is valid. In general, the validity of the request may be determined using any suitable technique or techniques. In some examples, the validity of the request may be determined using authentication techniques. In some examples, the validity of the request may be determined by evaluating a username and/or password provided by a client. If the request has been deemed to be invalid, the process of method 200 may continue at block 250. If the request has been deemed to be valid, the process of method 200 may continue at decision block 260.

At block 250, "Deny Request", the request for the data resource may be denied. In general, the request may be denied using any suitable technique or techniques. In some examples, the denial may include a message transmitted to the requesting client indicating failure of the request. In some examples, the message may include an indication that the client may attempt the request again. In some examples, and, in particular, upon multiple failed requests for a data resource or by a username, further action may be taken. In some examples, denying the request may include flagging the related data resource as a potentially targeted resource. In some examples, denying the request may include flagging a username as one that may be attempting invalid data requests.

At block 260, "Transmit the Data Resource", upon a valid request, the data particles may be transmitted to the requesting client. In general, the data particles may be transmitted using any suitable technique or techniques. In some examples, the data particles of the data resource may be transmitted from the storage resources under control of a resource of the cloud computing environment. In such examples, the client may reconstruct or recompose the data particles to generate the data resource. In some examples, the data particles may include information for reconstructing the data resource. In some examples, additional information regarding directions or an application, or the like for reconstruction may be provided. In some examples, the data particles may include an identifier field that may include a numbering or integer indicating the placement of the data particle in the data resource, as is discussed further herein and, in particular, with respect to FIG. 3.

In some examples, the data source may be reconstructed or formed from the data particles and the data source may be transmitted to the client. Such actions may be taken at a resource of the cloud computing environment. In some examples, the data particles may be recovered by a resource of the cloud computing environment by communicating a recovery request to the communication data particle in each logic group and the communication data particles in each logic group thereafter causing communication of the recovery request with the other data particles in that communication data particle's logic group. Such techniques may provide efficient recovery of the data particles.

As discussed, data security measures may be provided for a data resource by changing, over time, a logical separation and a physical separation of data particles. In some examples, additional data security measures may be provided. In some examples, the data resource may be encrypted prior to being partitioned into data particles (i.e., prior to block 210). In some examples, the data particles may be encrypted after being partitioned from the data resource (i.e., after block 210 but before block 220). In some examples, data particles may be encrypted upon storage (i.e., at block 220). Such encryption methods may be implemented using any suitable encryption technique or techniques including, for example, cipher techniques, password protected disk encryption techniques or the like.

As will be appreciated, the process of method 200 may be repeated or operated in parallel for any number of data sources. In some examples, the process of method 200 may be performed by a module of a cloud computing environment such as a data security module or the like. Such a module may be implemented in any suitable manner. In some examples, the data security module may be implemented as a computer, a plurality of computers, a server, a computing resource, a virtual machine, a computing cluster, or the like. In some examples, all data maintained at a cloud computing environment may be maintained using the security techniques discussed herein. In some examples, a portion of data maintained at a cloud computing environment may be maintained using the security techniques discussed herein. In such examples, higher priority or at risk data may be maintained using the security techniques discussed herein.

Figure 3:
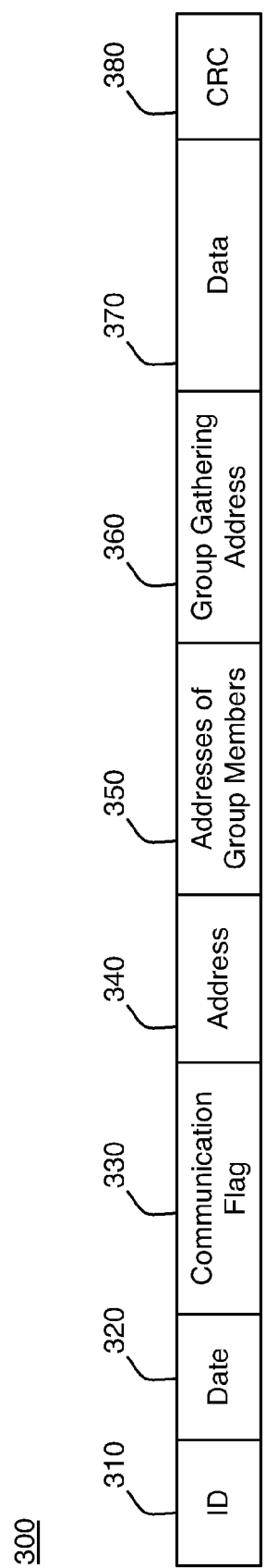
FIG. 3 is an illustration of a block diagram of an example data format for providing a secure data storage service in a cloud computing environment.

FIG. 3 is an illustration of a block diagram of an example data format 300 for providing a secure data storage service in a cloud computing environment, arranged in accordance with at least some embodiments of the present disclosure. As shown, data format 300 may include an identifier (ID) field 310, a date field 320, a communication flag field 330, an address field 340, an addresses of group members field 350, a group gathering address field 360, a data field 370, and a cyclic redundancy check (CRC) field 380. In some examples, data format 300 may be used for the format of the data particles discussed herein.

In some examples, ID field 310 may include an identifier of the data particle in the context of the data resource from which it was partitioned. In some examples, ID field 310 may be used to reconstruct the data particles to form the data resource. In general, ID field 310 may include any suitable information. In some examples, ID field 310 may include an integer that indicates the placement of the data particle represented by data format 300 in the data resource. In some examples, a data resource as discussed herein may be partitioned such that the resulting data particles may be an ordered set and ID field 310 may indicate the data particles position in that ordered set.

In some examples, date field 320 may include a time stamp related to the formation of the data particle represented by data format 300. In general, date field 320 may include any suitable information representing a time stamp. Date field 320 may be used to reconstruct a data particle, indicate whether a data particle may be valid, or the like.

In some examples, communication flag field 330 may include an identifier as to whether the data particle represented by data format 300 is a communication data particle of a logical group. As discussed herein, such communication data particles may be configured to communicate with a resource of the cloud computing environment upon reconstruction of a data resource. In general, communication flag field 330 may include any suitable information representing whether the data particle is a communication data particle such as Boolean value, a value of TRUE or FALSE, or the like.

In some examples, address field 340 may include information representing a location in a cloud computing environment at which the data particle represented by data format 300 resides. In general, address field 340 may include any suitable information representing the location in a cloud computing environment. In some examples, address field 340 may include an internet protocol (IP) address of a node in the cloud computing environment. In some examples, address field 340 may be the physical storage location of the data particle represented by data format 300.

In some examples, addresses of group members field 350 may include information representing the location or locations of all the data particles in the same logic group as the data particle represented by data format 300. In general, addresses of group members field 350 may include any suitable information representing the locations of the other data particles in the same logic group in a cloud computing environment. In some examples, addresses of group members field 350 may include one or more internet protocol (IP) addresses of nodes in the cloud computing environment.

In some examples, group gathering address field 360 may include information representing a position in the cloud computing environment where the data particle represented by data format 300 may gather upon receipt of a gathering notification. In some examples, the gathering notification may be sent by a resource of the cloud computing environment upon validation of a resource request, as is discussed herein. In general, group gathering address field 360 may include any suitable information representing a gathering location the data particle represented by data format 300. In some examples, group gathering address field 360 may include an internet protocol (IP) addresses of a node in the cloud computing environment. As discussed, in some examples, data particles may be transmitted to a client for reconstruction. In such examples, group gathering address field 360 may not be used.

In some examples, data field 370 may include information representing the portion of the data resource that has been partitioned into the data particle represented by data format 300. In general, data field 370 may include any suitable data including a portion of a data, image, audio, or video file, or a portion of an application, or a series of bytes, or the like.

In some examples, CRC field 380 may include information representing an error detection code that may be used to detect whether damage may have occurred to the data in data field 370. In general, CRC field 380 may include any suitable information for error detection. In some examples, the information in CRC field 380 may be calculated using the CRC32 algorithm based on the data in data field 370.

As discussed, the logical separation and physical separation of the data particles may be changed over time. Such separations may be implemented at least in part in data format 300. In some examples, the fields of data format 300 may generally be categorized as stable or variable. In some examples, the stable fields may include ID field 310, date field 320, and data field 370. In some examples, the variable fields may include communication flag field 330, address field 340, addresses of group members field 350, and CRC field 380. In general, the data particles as discussed herein may be loaded into agents using data format 300 or a similar data format. Such agents may be able to communicate and move efficiently in a cloud computing environment such as, for example, by moving from node to node in the cloud computing environment.

As discussed, security services may be provided for a data resource by partitioning the data resource and changing over time a logical and physical separation of the data particles. In order to further describe the security techniques provided herein, a simplified example is discussed herewith. In some examples, a data resource, D, may include any data file, image file, audio file, video file, application, or the like. Data resource, D, may be divided into data particles, $p_1, \ldots, p_i, \ldots, p_n$, where n may include any integer and may, in some example, be much greater than 1. In some examples, n may be generated randomly.

Assuming, for the sake of example, five data particles, the data particles may be defined as: $p_1, p_2, p_3, p_4, p_5$. As discussed, data particles may be assigned to logical groups. Assuming, for the sake of example, two logical groups, A and B, the data particles may be assigned (randomly, for example) as follows: $A=\{p_1, p_3, p_5\}$ and $B=\{p_2, p_4\}$. In such examples, the data particles may thereby be relabeled as follows: $A=\{p_1, p_3, p_5\}=\{p^A_1, p^A_2, p^A_3\}$ and $B=\{p_2, p_4\}=\{p^B_1, p^B_2\}$. Further, as discussed herein, each logical group may include a communication data particle (which may also be termed a key data particle). Continuing with the above example, letting pk indicate a communication (or key) data particle, the following may be assigned: $pk^A=p^A_2$, $pk_B=p^B_1$.

As discussed, the exemplary data particles assigned to logic groups and assigned communication data particles may be assigned to physical storage groups and stored separate storage resources of a cloud computing environment. Such physical storage may be provided by transferring the data particles among nodes in the cloud computing environment. In some examples, during transfer the data particles may be encrypted. In some examples, during transfer backups of the data particles may be maintained such that any lost or corrupted particles may be recovered. Upon receipt, the backups may be deleted.

As discussed, data particles may be assigned to different or drifting logic groups over time to enhance security. Also, as discussed herein, in some examples, data particles may go through a group aggregation or a group split at a logic group change iteration. In order to further describe a group aggregation technique, a simplified example is discussed herewith. For example, logic groups, $A=\{p^A_1, p^A_2, \ldots, p^A_N\}$, and B, $A=\{p^B_1, p^B_2, \ldots, p^B_M\}$, having key data particles, $pk^A=p^A_1$ and $pk^B=p^B_M$, may be defined, upon a group aggregation iteration to logic groups to a logic group, $AB=\{p^A_1, p^A_2, \ldots, p^A_N, p^B_1, p^B_2, \ldots, p^B_M\}=\{p^{AB}_1, p^{AB}_2, \ldots, p^{AB}_{n+M}\}$, having a key data particle, $p^{AB}_t$, where t is a randomly selected integer between 1 and M+N, inclusive. In some examples, the key data particle may be chosen using a technique other than random selection, such as polling techniques, voting techniques, collision techniques, or the like. The newly designated key data particle may set its communication data field to TRUE (or the like) and may notify other data particles in its group as to its address field. In some examples, the key data particle and other data particles in the newly aggregated group may update their group gathering address fields.

As discussed, in some examples, data particles may go through a group split at a logic group change iteration. In order to further describe a group split technique, a simplified example is discussed herewith. In some examples, group splits may split a logic group into one or more logic groups at random. For example, a logic group, $A=\{p^A_1, p^A_2, p^A_3, p^A_4, p^A_5\}$, having a key particle, $pk^A=p^A_1$, may be defined, upon a group split iteration to the logic group as multiple logic groups, $A_1=\{p^A_1, p^A_2, p^A_5\}$ (having a key particle, $p^A_3$) and $A_2=\{p^A_2, p^A_4\}$ (having a key particle, $p^A_2$).

In general, the methods described with respect to FIGS. 1 and 2 and elsewhere herein may be implemented in any suitable server and/or computing system. Example systems are described with respect to FIG. 5 and elsewhere herein. In some examples, a data security system, data center, data cluster, cloud computing environment, or other system as discussed herein may be implemented over multiple physical sites or locations. In general, the data security system may be configured to provide secure data storage services for any number of clients.

FIG. 4 illustrates an example computer program product 400, arranged in accordance with at least some embodiments of the present disclosure. Computer program product 400 may include machine readable non-transitory medium having stored therein a plurality of instructions that, when executed, cause the machine to provide secure data storage service according to the processes and methods discussed herein. Computer program product 400 may include a signal bearing medium 402. Signal bearing medium 402 may include one or more machine-readable instructions 404, which, when executed by one or more processors, may operatively enable a computing device to provide the functionality described herein. In various examples, some or all of the machine-readable instructions may be used by the devices discussed herein.

In some implementations, signal bearing medium 402 may encompass a computer-readable medium 406, such as, but not limited to, a hard disk drive, a Compact Disc (CD), a Digital Versatile Disk (DVD), a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communication link, a wireless communication link, etc.). In some examples, signal bearing medium 402 may encompass a machine readable non-transitory medium.

Figure 5:
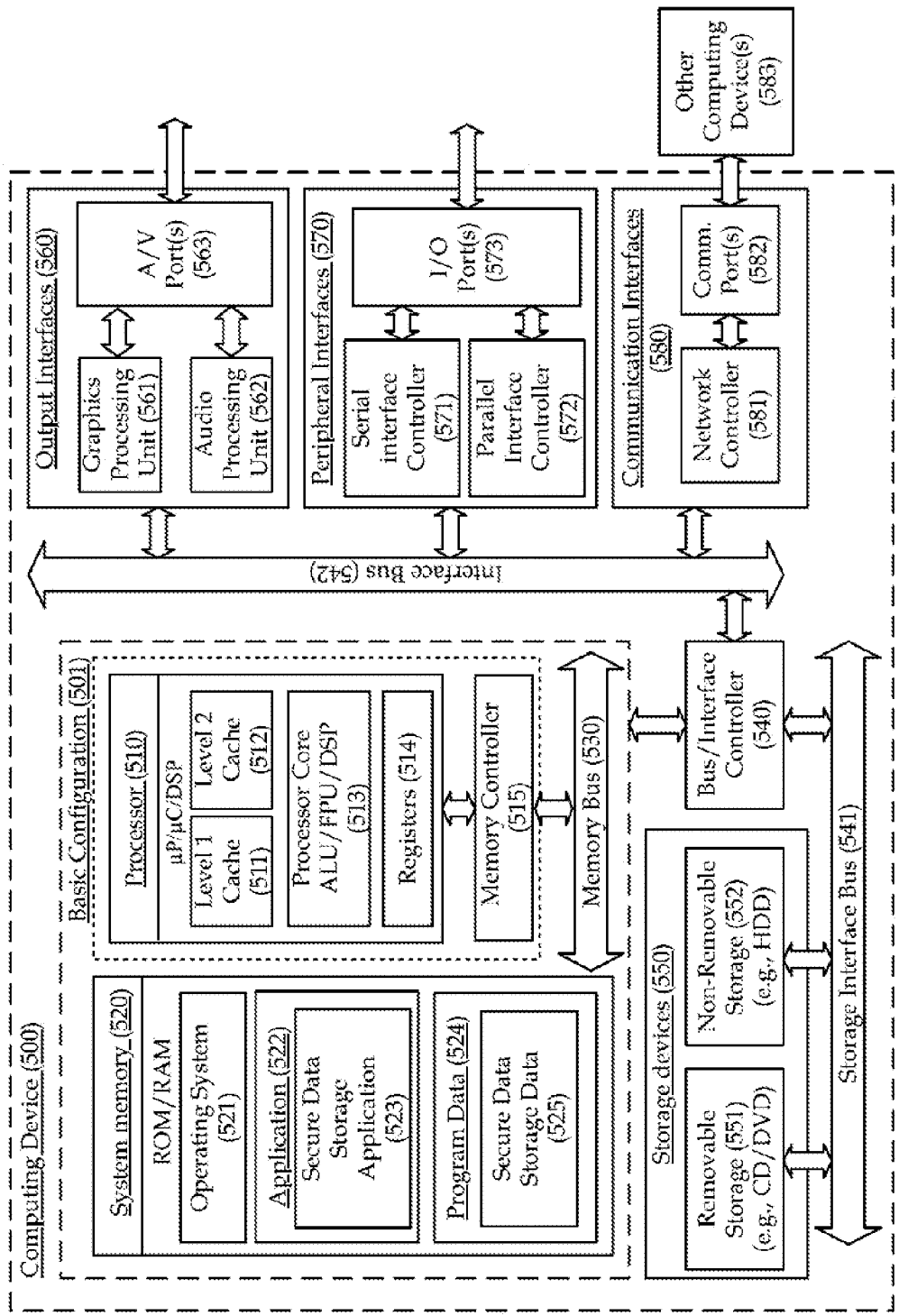
FIG. 5 is an illustration of a block diagram of an example computing device, all arranged in accordance with at least some embodiments of the present disclosure.

FIG. 5 is a block diagram illustrating an example computing device 500, arranged in accordance with at least some embodiments of the present disclosure. In various examples, computing device 500 may be configured to provide a secure data storage service as discussed herein. In various examples, computing device 500 may be configured to provide a secure data storage service as a server system as discussed herein. In one example basic configuration 501, computing device 500 may include one or more processors 510 and system memory 520. A memory bus 530 can be used for communicating between the processor 510 and the system memory 520.

Depending on the desired configuration, processor 510 may be of any type including but not limited to a microprocessor (μP), a microcontroller (μC), a digital signal processor (DSP), or any combination thereof. Processor 510 can include one or more levels of caching, such as a level one cache 511 and a level two cache 512, a processor core 513, and registers 514. The processor core 513 can include an arithmetic logic unit (ALU), a floating point unit (FPU), a digital signal processing core (DSP Core), or any combination thereof. A memory controller 515 can also be used with the processor 510, or in some implementations the memory controller 515 can be an internal part of the processor 510.

Depending on the desired configuration, the system memory 520 may be of any type including but not limited to volatile memory (such as RAM), non-volatile memory (such as ROM, flash memory, etc.) or any combination thereof. System memory 520 may include an operating system 521, one or more applications 522, and program data 524. Application 522 may include secure data storage application 523 that can be arranged to perform the functions, actions, and/or operations as described herein including the functional blocks, actions, and/or operations described herein. Program Data 524 may include secure data storage data 525 for use with secure data storage application 523. In some example embodiments, application 522 may be arranged to operate with program data 524 on an operating system 521. This described basic configuration is illustrated in FIG. 5 by those components within dashed line 501.

Computing device 500 may have additional features or functionality, and additional interfaces to facilitate communications between the basic configuration 501 and any required devices and interfaces. For example, a bus/interface controller 540 may be used to facilitate communications between the basic configuration 501 and one or more data storage devices 550 via a storage interface bus 541. The data storage devices 550 may be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of device 500.

Computing device 500 may also include an interface bus 542 for facilitating communication from various interface devices (e.g., output interfaces, peripheral interfaces, and communication interfaces) to the basic configuration 501 via the bus/interface controller 540. Example output interfaces 560 may include a graphics processing unit 561 and an audio processing unit 562, which may be configured to communicate to various external devices such as a display or speakers via one or more A/V ports 563. Example peripheral interfaces 570 may include a serial interface controller 571 or a parallel interface controller 572, which may be configured to communicate with external devices such as input devices (e.g., keyboard, mouse, pen, voice input device, touch input device, etc.) or other peripheral devices (e.g., printer, scanner, etc.) via one or more I/O ports 573. An example communication interface 580 includes a network controller 581, which may be arranged to facilitate communications with one or more other computing devices 583 over a network communication via one or more communication ports 582. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 500 may be implemented as a portion of a small-form factor portable (or mobile) electronic device such as a cell phone, a mobile phone, a tablet device, a laptop computer, a personal data assistant (PDA), a personal media player device, a wireless web-watch device, a personal headset device, an application specific device, or a hybrid device that includes any of the above functions. Computing device 500 may also be implemented as a personal computer including both laptop computer and non-laptop computer configurations. In addition, computing device 500 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communication link, a wireless communication link, etc.).

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A computer implemented method to provide a secure data storage service in a cloud computing environment comprising:
partitioning, at a resource of the cloud computing environment, a data resource received from a client for secure storage in the cloud computing environment into a plurality of data particles;
changing, over time, a logical separation and a physical separation of the data particles in the data resource by performing the following operations on the data resource repeatedly over time while the data resource is stored in the cloud computing environment:
assigning, at the data resource, a plurality of logic groups to the data particles, wherein each logic group includes one or more data particles including at least one communication data particle, wherein the one or more data particles in each of the logic groups is configured to communicate with any other data particle in that logic group, and wherein each communication data particle is configured to communicate with the resource;
assigning, at the data resource, a plurality of physical storage groups to the data particles, wherein each of the physical storage groups includes one or more data particles; and
storing each physical storage group at a corresponding storage resource of a plurality of storage resources of the cloud computing environment, wherein each storage resource is physically separate from the other storage resources;
receiving a request for the data resource from the client;
determining, at the resource, whether the request for the data resource is valid; and
responsive to a determination that the request for the data resource is valid, transmitting the data particles of the data resource to the client,
wherein changing, over time, a logical separation and a physical separation of the data particles in the data resource comprises changing the logical separation and the physical separation of the data particles at a frequency that varies as a function of a security level of the data resource.

2. The computer implemented method of claim 1, further comprising:
encrypting, at the resource, the data resource before partitioning the data resource into a plurality of data particles.

3. The computer implemented method of claim 1, further comprising:
encrypting, at the resource, the plurality of data particles.

4. The computer implemented method of claim 1, wherein assigning the plurality of logic groups to the data particles comprises assigning the plurality of logic groups to the data particles randomly.

5. The computer implemented method of claim 1, wherein assigning the plurality of physical storage groups to the data particles comprises assigning the plurality of physical storage groups to the data particles randomly.

6. The computer implemented method of claim 1, wherein the resource of the cloud computing environment comprises at least one of a computer, a plurality of computers, a server, a computing resource, a virtual machine, or a computing cluster.

7. The computer implemented method of claim 1, wherein the data resource comprises at least one of a data file, an image file, an audio file, a video file, or an application.

8. The computer implemented method of claim 1, wherein changing, over time, the logical separation and the physical separation of the data particles in the data resource comprises changing the logical separation and the physical separation of the data particles after a random duration.

9. The computer implemented method of claim 1, wherein transmitting the data particles of the data resource to the client comprises transmitting the data particles of the data resource from the plurality of storage resources under control of the resource.

10. The computer implemented method of claim 1, wherein transmitting the data particles of the data resource to the client comprises receiving the data particles from the data resource at the resource, forming the data source from the data particles, and transmitting the data resource from the resource.

11. The computer implemented method of claim 1, wherein partitioning the data resource into the plurality of data particles comprises numbering each data particle for later reassembly.

12. The computer implemented method of claim 1, wherein each data particle comprises at least one of a particle identifier, a creation time stamp, an indication of whether the data particle is one of the communication data particles, a first address indicating the storage resource of the data particle, a second address indicating at least one storage resource of at least one data particle in the logic group of the data particle, a gather address, a data packet, or a cyclic redundancy check code.

13. The computer implemented method of claim 1, wherein each of the plurality of data particles is loaded into an agent.

14. The computer implemented method of claim 1, wherein at least one communication data particle of a logic group is reassigned from one data particle of the logic group to another data particle of the logic group.

15. The computer implemented method of claim 1, wherein the one or more data particles in each of the logic groups is configured to communicate with any other data particles in that logic group via peer-to-peer communications.

16. A machine readable non-transitory medium having stored therein instructions that, when executed, cause a cloud computing resource in a cloud computing environment to provide a secure data storage service by:
partitioning a data resource received from a client for secure storage in the cloud computing environment into a plurality of data particles;
changing, over time, a logical separation and a physical separation of the data particles in the data resource by performing the following operations on the data resource repeatedly over time while the data resource is stored in the cloud computing environment:
assigning a plurality of logic groups to the data particles, wherein each logic group includes one or more data particles including at least one communication data particle, wherein the one or more data particles in each of the logic groups is configured to communicate with any other data particle in that logic group, and wherein each communication data particle is configured to communicate with the cloud computing resource;

assigning a plurality of physical storage groups to the data particles, wherein each of the physical storage groups includes one or more data particles; and storing each physical storage group at a corresponding storage resource of a plurality of storage resources of the cloud computing environment, wherein each storage resource is physically separate from the other storage resources;

receiving a request for the data resource from the client;

determining whether the request for the data resource is valid; and responsive to a determination that the request for the data resource is valid, transmitting the data particles of the data resource to the client, wherein changing, over time, a logical separation and a physical separation of the data particles in the data resource comprises changing the logical separation and the physical separation of the data particles at a frequency that varies as a function of a security level of the data resource.

17. The machine readable non-transitory medium of claim 16 having stored therein further instructions that, when executed, cause the cloud computing resource in the cloud computing environment to provide the secure data storage service by:

encrypting the data resource before partitioning the data resource into a plurality of data particles.

18. The machine readable non-transitory medium of claim 16 having stored therein further instructions that, when executed, cause the cloud computing resource in the cloud computing environment to provide the secure data storage service by:

encrypting the plurality of data particles.

19. The machine readable non-transitory medium of claim 16, wherein transmitting the data particles of the data resource to the client comprises transmitting the data particles of the data resource from the plurality of storage resources.

20. The machine readable non-transitory medium of claim 16, wherein transmitting the data particles of the data resource to the client comprises receiving the data particles from the data resource at the resource, forming the data source from the data particles, and transmitting the data resource from the resource.

21. The machine readable non-transitory medium of claim 16, wherein each data particle comprises at least one of a particle identifier, a creation time stamp, an indication of whether the data particle is one of the communication data particles, a first address indicating the storage resource of the data particle, a second address indicating at least one storage resource of at least one data particle in the logic group of the data particle, a gather address, a data packet, or a cyclic redundancy check code.

22. A cloud computing resource comprising:

a processor; and a memory comprising a machine readable medium having stored therein instructions that, when executed, cause a cloud computing environment to provide a secure data storage service by:

partitioning a data resource received from a client for secure storage in the cloud computing environment into a plurality of data particles;

changing, over time, a logical separation and a physical separation of the data particles in the data resource by performing the following operations on the data resource repeatedly over time while the data resource is stored in the cloud computing environment:

assigning a plurality of logic groups to the data particles, wherein each logic group includes one or more data particles including at least one communication data particle, wherein the one or more data particles in each of the logic groups is configured to communicate with any other data particle in that logic group, and wherein each communication data particle is configured to communicate with the cloud computing resource;

assigning a plurality of physical storage groups to the data particles, wherein each of the physical storage groups includes one or more data particles; and storing each physical storage group at a corresponding storage resource of a plurality of storage resources of the cloud computing environment, wherein each storage resource is physically separate from the other storage resources;

receiving a request for the data resource from the client;

determining whether the request for the data resource is valid; and responsive to a determination that the request for the data resource is valid, transmitting the data particles of the data resource to the client; and a processor coupled to the machine readable medium to execute the instructions, wherein changing, over time, a logical separation and a physical separation of the data particles in the data resource comprises changing the logical separation and the physical separation of the data particles at a frequency that varies as a function of a security level of the data resource.

23. The cloud computing resource of claim 22, wherein the machine readable medium has stored therein further instructions that, when executed, cause the cloud computing environment to provide secure data storage services by:

encrypting the data resource before partitioning the data resource into a plurality of data particles.

24. The cloud computing resource of claim 22, wherein the machine readable medium has stored therein further instructions that, when executed, cause the cloud computing environment to provide secure data storage services by:

encrypting the plurality of data particles.

25. The cloud computing resource of claim 22, wherein transmitting the data particles of the data resource to the client comprises transmitting the data particles of the data resource from the plurality of storage resources.

26. The cloud computing resource of claim 22, wherein transmitting the data particles of the data resource to the client comprises receiving the data particles from the data resource at the resource, forming the data source from the data particles, and transmitting the data resource from the resource.

27. The cloud computing resource of claim 22, wherein each data particle comprises at least one of a particle identifier, a creation time stamp, an indication of whether the data particle is one of the communication data particles, a first address indicating the storage resource of the data particle, a second address indicating at least one storage resource of at least one data particle in the logic group of the data particle, a gather address, a data packet, or a cyclic redundancy check code.

* * * * *

UNITED STATES PATENT AND TRADEMARK OFFICE
CERTIFICATE OF CORRECTION

| | | |
|---|---|---|
| PATENT NO. | : 9,225,770 B2 | |
| APPLICATION NO. | : 13/817694 | |
| DATED | : December 29, 2015 | |
| INVENTOR(S) | : Wang et al. | |

It is certified that error appears in the above-identified patent and that said Letters Patent is hereby corrected as shown below:

Specification

In Column 1, Line 8, delete "§371" and insert -- § 371 --, therefor.

In Column 11, Line 56, delete "$pk_B = p^B{}_1.$" and insert -- $pk^B = p^B{}_1.$ --, therefor.

Signed and Sealed this
Twenty-sixth Day of April, 2016

Michelle K. Lee
*Director of the United States Patent and Trademark Office*